J. C. REICH.
MACHINE FOR CUTTING AND SPACING SOFT RUBBER RODS AND THE LIKE.
APPLICATION FILED AUG. 24, 1916.

1,257,960.

Patented Feb. 26, 1918.
5 SHEETS—SHEET 3.

Inventor
John Carl Reich
by George Bayard Jones
Atty

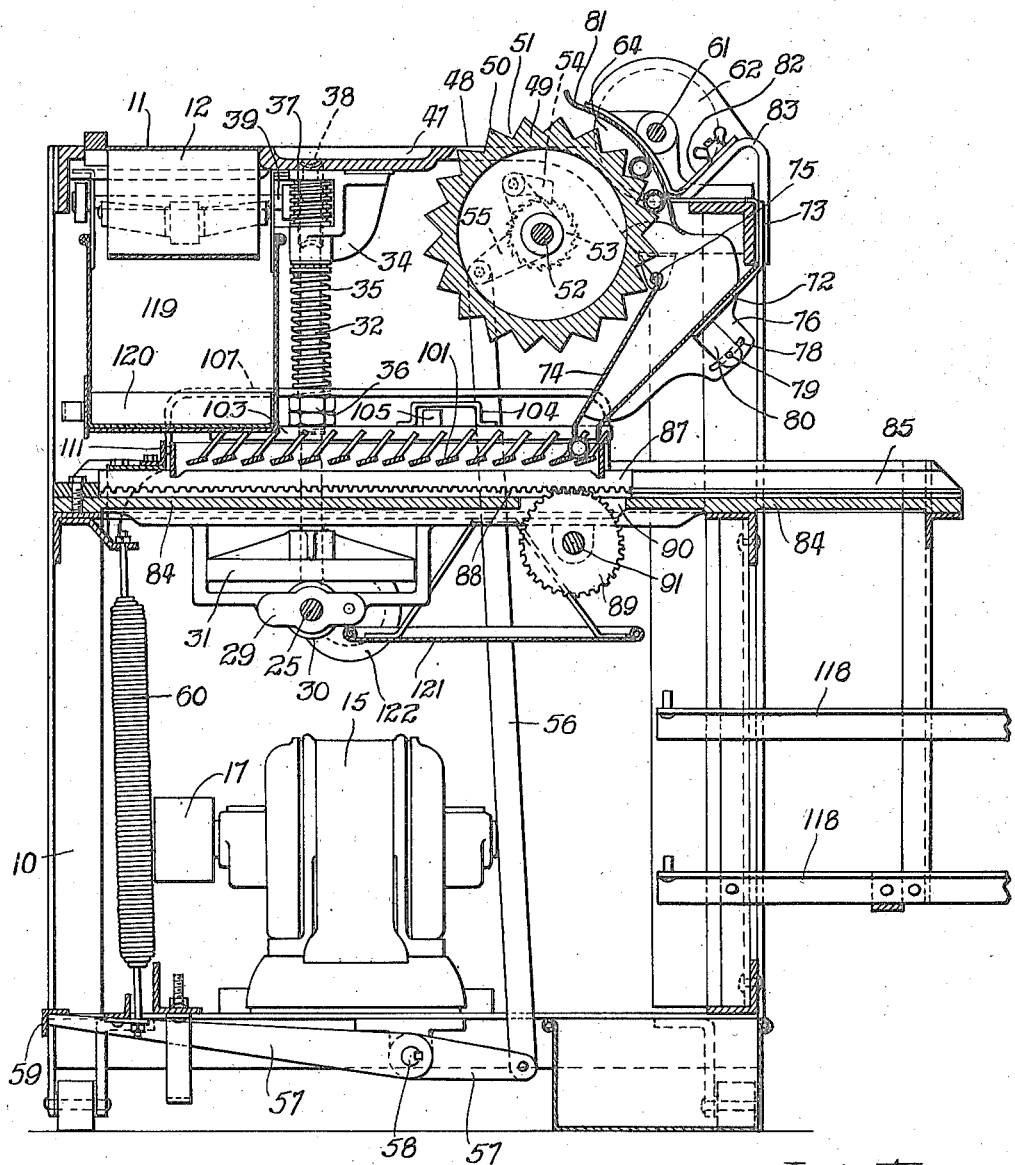

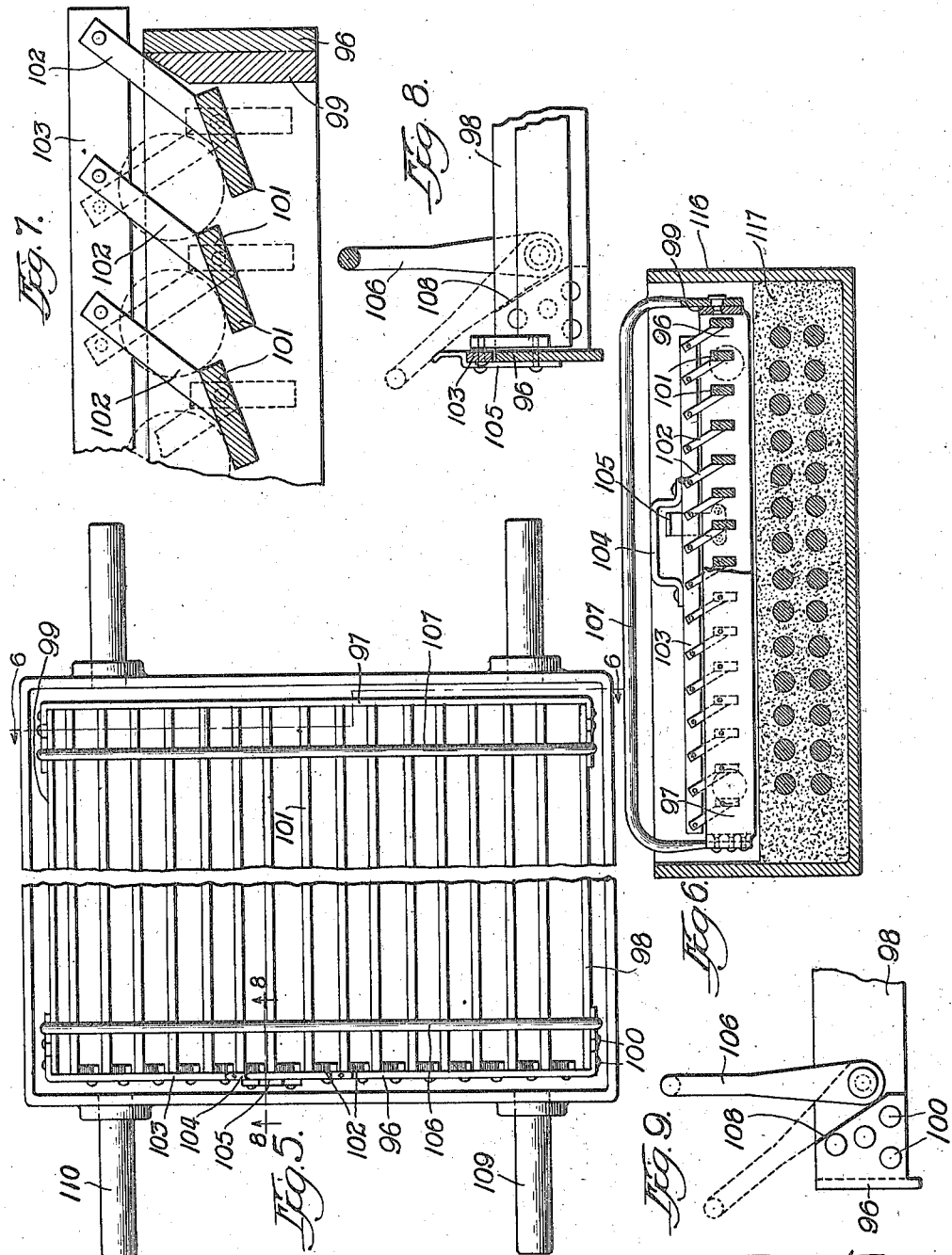

UNITED STATES PATENT OFFICE.

JOHN CARL REICH, OF CHICAGO, ILLINOIS, ASSIGNOR TO WESTERN ELECTRIC COMPANY, INCORPORATED, OF NEW YORK, N. Y., A CORPORATION OF NEW YORK.

MACHINE FOR CUTTING AND SPACING SOFT-RUBBER RODS AND THE LIKE.

1,257,960.  Specification of Letters Patent.  Patented Feb. 26, 1918.

Application filed August 24, 1916.  Serial No. 116,726.

*To all whom it may concern:*

Be it known that I, JOHN CARL REICH, a citizen of the United States, residing at Chicago, in the county of Cook and State of Illinois, have invented new and useful Improvements in Machines for Cutting and Spacing Soft-Rubber Rods and the like, of which the following is a full, clear, concise, and exact description.

This invention relates to machines for facilitating the handling of soft rubber prior to the valcanizing thereof.

In the manufacture of rubber rods, tubes, and the like, the soft rubber is forced out of or extruded from a receptacle through an opening therein, which gives it the desired cross sectional form. The lengths of soft material are vulcanized after being placed in a suitable receptacle containing powdered soapstone, in which they are supported out of contact with each other. To insure efficient use of the vulcanizing apparatus, it is desirable to have the lengths of soft rubber fairly close together, although not in actual contact. It is difficult to effect such close packing by hand owing to the softness of the material.

An object of the present invention is to provide means whereby uniformly close spacing and packing of the soft rubber lengths may be readily accomplished.

Another object of the invention is to provide spacing means which will serve to keep the rods straight during the handling preliminary to and during the process of vulcanization.

Figure 1:
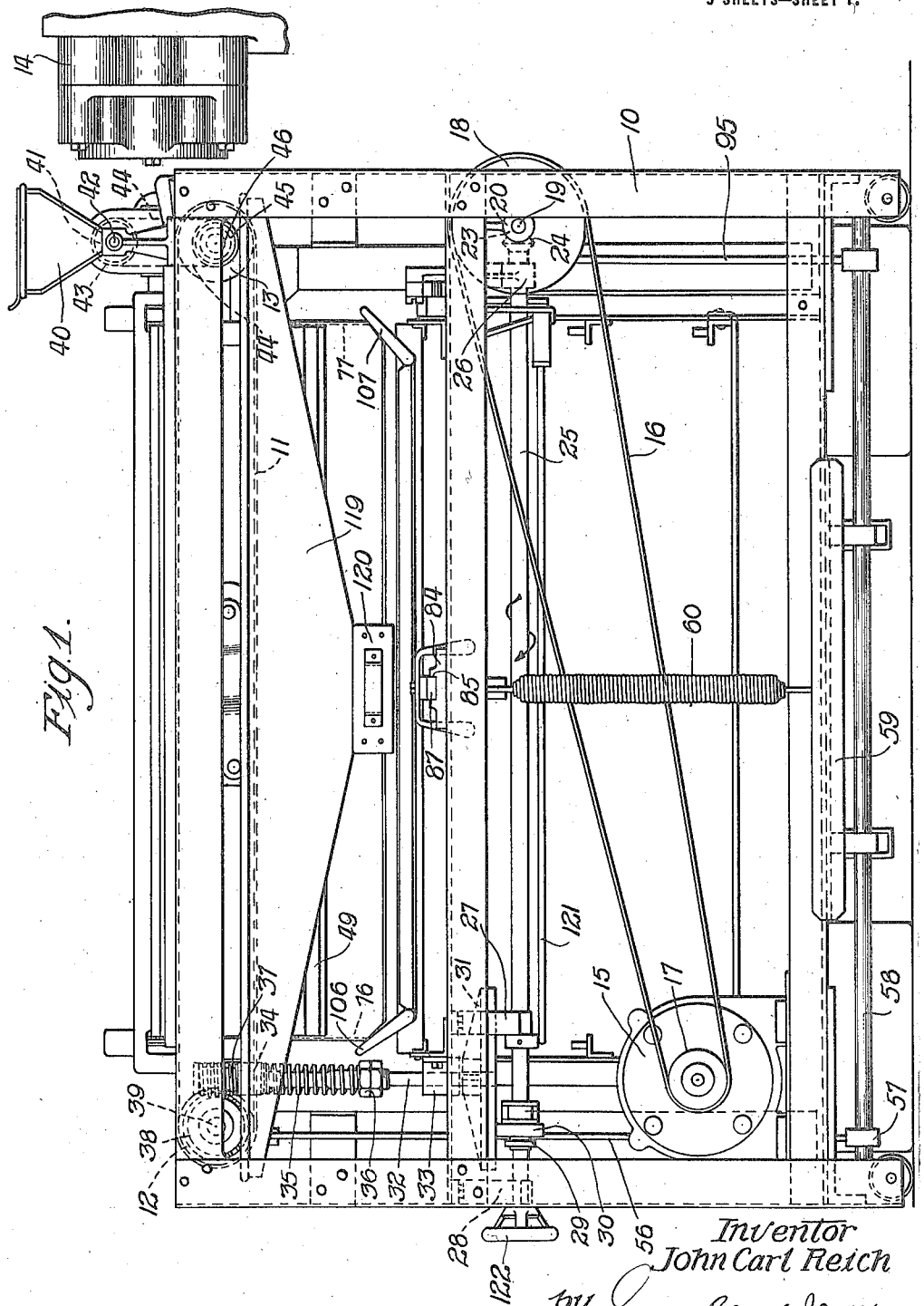
Figure 2:
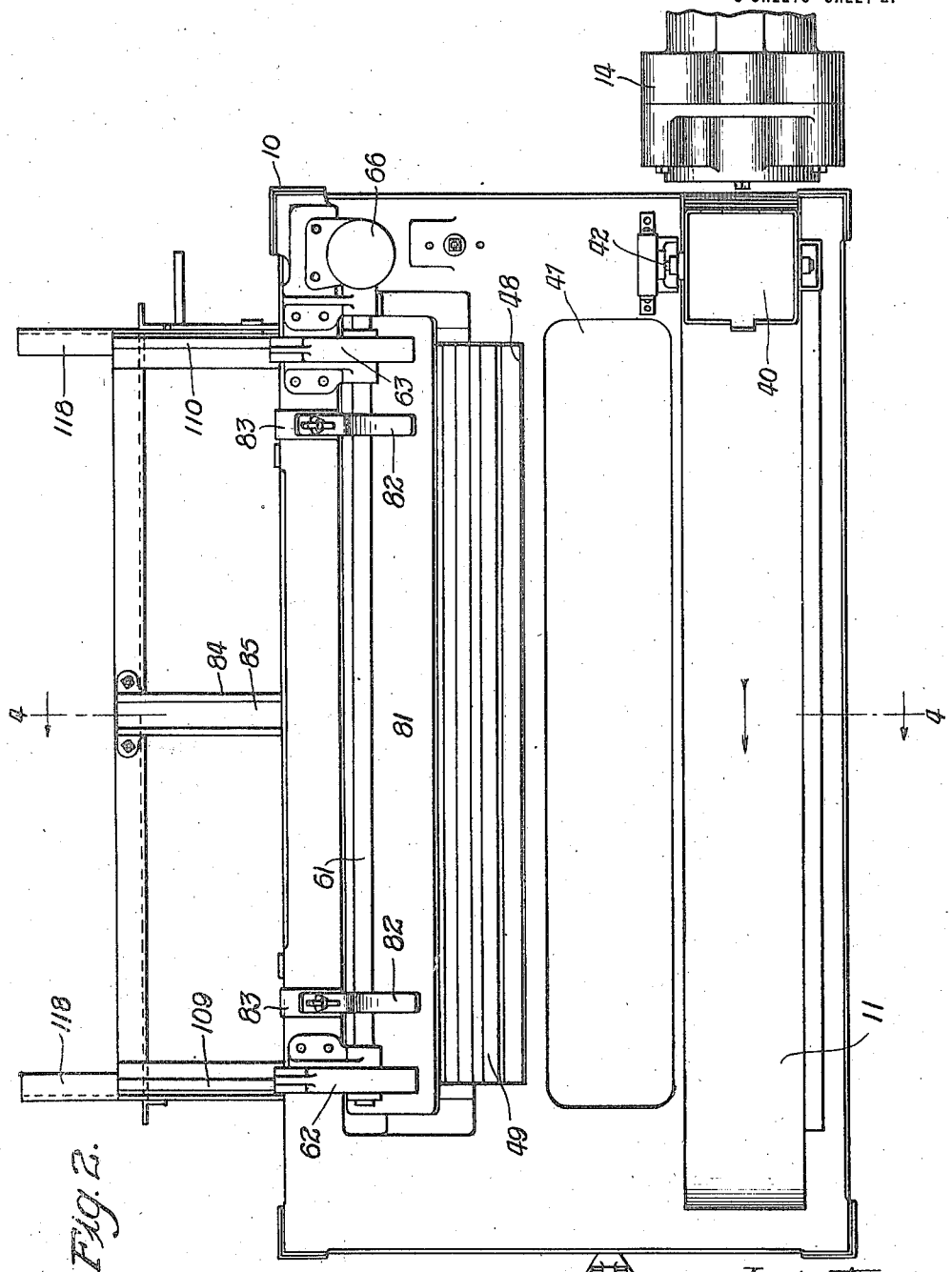
Figure 3:
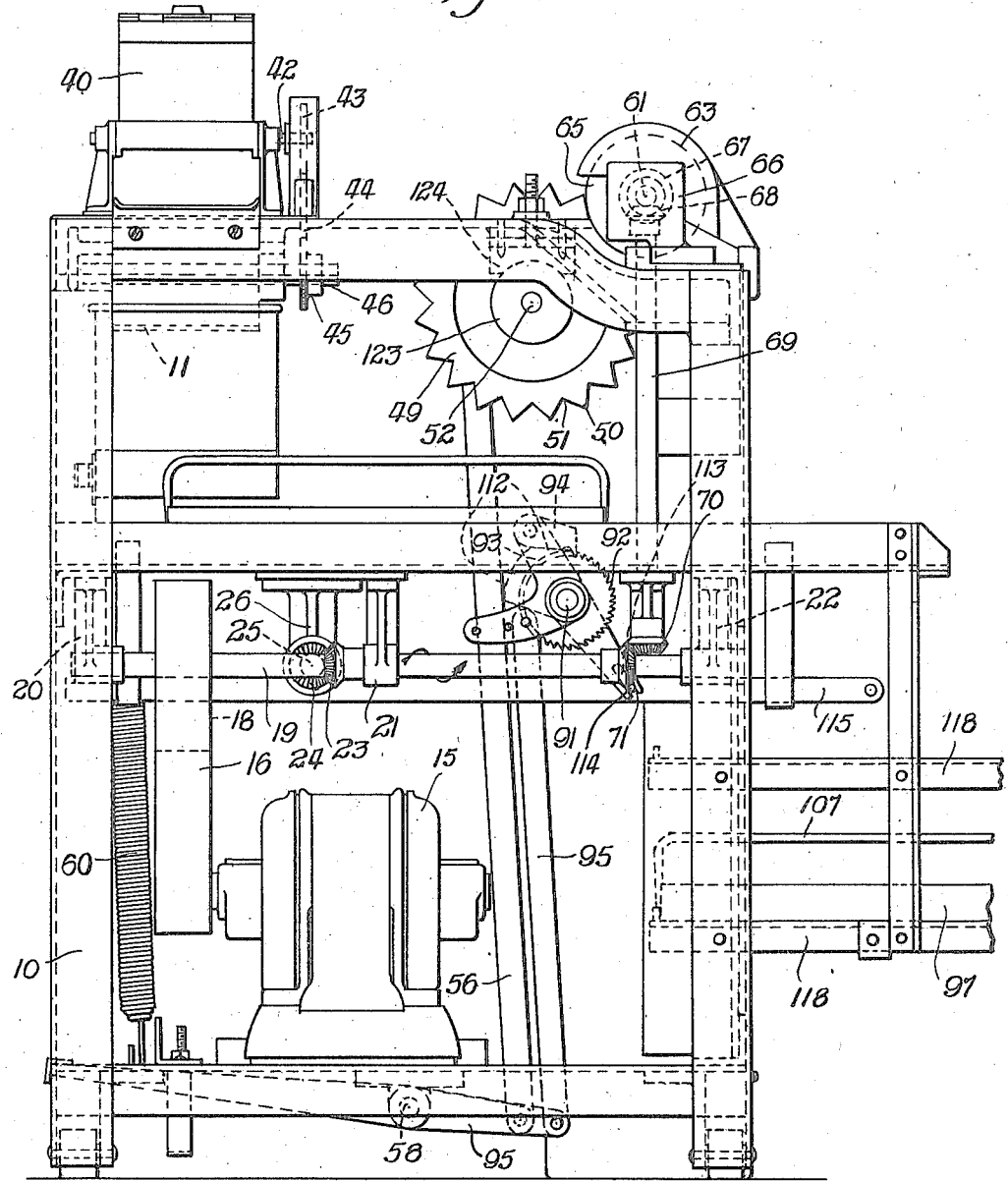

One embodiment of the invention is illustrated in the accompanying drawings in which:

Figure 1 is a front elevational view;
Fig. 2 is a plan view;
Fig. 3 is a side elevational view;
Fig. 4 is a sectional view on line 4—4, Fig. 2;
Fig. 5 is a plan view of a rod receiving tray and the soapstone container into which rods are discharged;
Fig. 6 is a sectional view on line 6—6, Fig. 5;
Fig. 7 is an enlarged sectional view of one end of the tray;
Fig. 8 is an enlarged sectional view on line 8—8, Fig. 5, and
Fig. 9 is an end view of a corner of the tray.

The machine has a suitable frame 10, adjacent the front edge of which an endless belt 11 is mounted on pulleys 12 and 13 suitably journaled on the frame. The rods or tubes to be vulcanized are delivered to the belt from a head 14, the soft rubber composition being in practice extruded from the head to form the rod or tube lengths which are received by the belt. On the lower part of the machine frame a motor 15 is supported and a driving belt 16 connects the motor pulley 17 with the pulley 18 on the transverse shaft 19, journaled in bearing brackets 20, 21 and 22 suspended from the machine frame. The shaft 19 mounts a bevel pinion 23 which meshes with a pinion 24 at the right end of the longitudinally extending shaft 25 which is journaled in the brackets 26, 27 and 28 suspended from the machine frame. At its left end the shaft 25 supports a bearing frame 29 for the friction wheel 30. This friction wheel bears against a friction disk 31 secured at the lower end of the vertical shaft 32 which is journaled in the bearing frames 33 and 34. A spring 35 encircles the shaft between the bearing frames 33 and 34 and nuts 36 of the shaft whereby the friction disk is held firmly against the friction wheel. Within the bearing frame 34 the shaft 32 has a worm 37 secured thereto which meshes with the worm wheel 38 on the shaft 39 which supports the belt pulley 12. The belt 11 is driven with its horizontal top span moving away from the head 14, so that the received rod lengths are carried to the center of the machine top. To prevent the freshly formed rubber rods from sticking to the belt, and when being handled, soapstone or other suitable material is preferably applied thereto. As shown, a hopper 40 is mounted over the receiving end of the belt and to insure delivery of the contents in fine pulverized condition to the belt and rods thereon, pulverizing mechanism 41 is operable within the hopper, the shaft 42 for this mechanism mounting a pulley 43 which is connected by belt 44 with the pulley 45 on the shaft 46 which mounts the belt pulley 13.

Extending longitudinally of the machine and directly behind the belt the frame top has the depression 47 which is filled with soapstone. Into this depression the operator at the front of the machine rolls the rods from the belt, the rods being then fully coated with soapstone. Extending longitudinally of the machine behind the depression 47 and projecting a short distance above the frame top through the opening 48 is the conveyer cylinder 49 having the longitudinally extending teeth 50 forming conveyer pockets 51. Into the successive pockets of this conveyer star cylinder, the operator shifts the rods one by one from the depression or tray 47 and as the cylinder is rotated the rods are conveyed to chute mechanism to be described later.

The cylinder is mounted on the shaft 52 which is journaled at its ends in suitable bearings on the frame, and at its left end the cylinder carries a ratchet wheel 53 with which a pawl 54 coöperates, this pawl being pivoted to the upper arm of the bell crank lever 55 pivoted on the shaft 52 and whose lower arm is connected by a rod 56 with the arm 57 extending rearwardly from the shaft 58 which extends longitudinally at the lower part of the machine frame. A treadle frame 59 is secured to the shaft 58 and when this frame is depressed, the arm 57 and the rod 56 will be raised and the lever 55 will be swung and the pawl 54 will rotate the ratchet wheel 53 and the conveyer cylinder a peripheral distance equal to the distance between adjacent tooth points. A spring 60 raises the treadle frame after release thereof.

A shaft 61 extends across the machine behind the conveyer cylinder and parallel therewith, the shaft being journaled at its ends in housing structures 62 and 63 in which structures the shaft mounts cutter disks or blades 64 and 65 respectively, the blades projecting alongside of the respective ends of the carrier cylinder so that they will engage with the projecting ends of the rods in the trough of the cylinder to cut off the ends and to trim the rods to uniform length. The shaft 61 extends at its right end into a bearing frame 66 and there supports a gear pinion 67 which meshes with the pinion 68 on the vertical shaft 69 which at its lower end has the bevel gear 70 engaged by the bevel gear 71 on the drive shaft 19.

After trimming of the rods, they are delivered by the carrier cylinder to a rear chute plate 72, which slants diagonally forwardly and is supported on hangers 73. The front chute wall 74 is pivoted at its upper corners as indicated at 75 and plates 76 and 77 secured to the ends of the wall 74 extend rearwardly alongside the ends of the rear wall 72 and are slotted as indicated at 78 to receive the screw studs 79 on arms 80 extending from the lower ends of the hangers 73. With this arrangement, the lower end of wall 74 may be adjusted with reference to the lower end of the wall 72 to vary the chute outlet and after adjustment the wall 74 is secured by tightening up the nuts on the screw studs 79. To guide the rods into the chute from the carrier cylinder, guard springs 81 are mounted on supporting brackets 82 which have adjustable pin and slot connection with supports 83 whereby the guard springs may be shifted toward or away from the carrier cylinder. These guard springs and the chute outlet are adjustable for adapting the machine for rods of different diameters.

Extending transversely of the machine below the outlet of the chute is the plate 84 which has the central longitudinal groove 85 in which engages a bar 87 having rack teeth 88 on its under side to be engaged by a gear wheel 89 extending through the opening 90 in the plate 84. This gear is mounted on a longitudinally extending shaft 91, which at its right end supports a ratchet wheel 92. The upper arm of the bell crank lever structure 93 pivots a pawl 94 which coöperates with the ratchet wheel 92, the lower arm of the lever being connected by the arm 95 which extends rearwardly from the treadle shaft 58 so that when the treadle is depressed the lever 93 will be swung and the pawl 94 caused to rotate the ratchet wheel 92 and the gear wheel 89 a fraction of a revolution whereby to shift the rack bar 87 rearwardly in its groove.

The bar 87 supports trays which receive the trimmed rods from the chute leading from the carrier. The construction of this tray is clearly shown in Figs. 5 to 9. The tray comprises the sides 96 and 97 and the ends 98 and 99, the ends of the sides overlapping the ends and secured thereto as by means of rivets 100. Extending between the sides 96 and 97 and trunnioned at the ends therein are the louvers 101, each of which has an arm 102 extending upwardly therefrom and connected with a bar 103 which has a handle 104 thereon. By shifting this bar back and forth, the louvers are brought into vertical parallel position as shown in Fig. 6, or in inclined position as shown in Fig. 7. A stop 105 secured to the side 96 limits the shift of the bar 103. In order to carry the tray, it has the bales 106 and 107 pivoted to the ends 98 and 99 adjacent to and parallel with the sides 96 and 97 and these bales may be swung outwardly to carry their tops beyond the sides 96 and 97, the bales in this position resting against the beveled corners 108 of the overlapping ends of the sides 96 and 97, as clearly shown in Figs. 8 and 9. The tray is slid into the machine on the guides 109 and 110 and straddles the rack bar 87 with its front end abutting against the abutment 111 on the rack bar, and the tray with the rack bar is then shifted to the front of the machine with the rear end of the tray below the chute outlet to receive the rods. Before the machine is started the handle 104 is shifted to bring the louvers in inclined position, as shown in Figs. 4 and 7. The machine is then started and the first rod passes around the carrier drum and along the chute wall 72 to be delivered in the tray on the rearmost louver. When the pedal is then depressed, the carrier cylinder will be rotated and the rack bar with the tray thereon will be shifted rearward to bring the next louver below the chute to receive the next rod, and so on until the tray is filled, the filled tray being taken away from the machine and a new tray inserted. To permit return shift of the rack bar 87 with an empty tray thereon, provision is made to release the pawl 94 from the ratchet wheel 92. A cam lever 112 is pivoted on the shaft 91 and has the slot 113 which receives the pin 114 extending from the slide rod 115. When this rod is pulled forwardly, the cam lever will be rotated and its cam surface brought below the pin 114 extending from the pawl, and the pawl is raised from the ratchet wheel so that the shaft 91 and the gear wheel 89 thereon may rotate freely as the rack bar 87 is shifted to the front of the machine with the tray thereon. After an empty tray has thus been placed in the machine, the rod 115 is shifted rearwardly to withdraw the cam from the pawl and the machine is again operated until the tray is filled.

The filled trays are carried from the machine and held over a box 116 containing soapstone 117 and by means of the handle 104 the bar 103 is shifted to cause the louvers to be swung into vertical position to release the rods. After each layer of rods has been dropped into the box 116, a layer of soapstone is applied to receive the rods from the next tray, and so on. After the box is filled, it is placed in a suitable vulcanizer and the rods are vulcanized. On the back end of the machine, shelves 118 are arranged to support the trays before they are inserted in the machine or after they have been filled.

At the front of the machine and below the top thereof is the sheet metal collector frame 119 for receiving the soapstone which drops from the belt, a drawer 120 being provided at the lower end of the collector. Also underneath the chute 72, 74, a tray 121 is suspended for collecting soapstone dropping from the rods.

In order to adjust the proper speed of the rod conveyer belt 11, the bearing frame 29 for the friction wheel 30 is shiftable by means of a hand wheel 122.

A brake wheel 123 is mounted on the shaft 52 of the carrier drum, which is engaged by an adjustable brake shoe 124. This braking mechanism prevents overthrow of the carrier.

With the apparatus described, it will be seen that the soft rubber is prepared for the vulcanizing operation with a minimum amount of handling. The rubber is cut into uniform lengths and said lengths are thereafter prevented from bending, whereby they may be packed in the soapstone in close relation without touching each other. The uniformity of the spacing permits the apparatus to be used to its maximum capacity, thereby insuring efficient operation.

For purposes of illustration, rubber rods or tubes have been referred to herein. It will be apparent, however, that the mechanism described is not limited in its utility to such products, but may be otherwise employed. Also the structural features described need not all be included in a single machine. Furthermore, various changes in the apparatus may be made without departing from the invention, as set out in the appended claims.

What is claimed is:

1. In a device of the class described, means for extruding soft rubber rods from a container, means for cutting said rods into uniform lengths, means for directing said lengths from the cutting means to a suitable receptacle, and means for causing a relative movement of said directing means with respect to said receptacle whereby said cut lengths are arranged in spaced relation in said receptacle.

2. In a device of the class described, a tray having louvers therein, a chute adjacent thereto for delivering soft rubber rods to said tray, and means for moving said tray with respect to said chute in such timed relation that only one rod is deposited on each of said louvers.

3. In a device of the class described, a frame having louvers therein, means for depositing soft rubber rods on said louvers, and means for simultaneously moving all of said louvers to discharge said rods therefrom in uniform spaced relation.

4. The combination with a head from which soft rubber composition is extruded, of a table adjacent thereto having a belt traveling thereover, a pair of rotatable cutting members, a chute beneath said members, a tray beneath said chute having louvers therein, and means for imparting an intermittent movement to said tray corresponding to the distance between said louvers.

5. In a device of the class described, a tray comprising a side frame, a plurality of parallel louvers pivoted thereto, said louvers being normally nearly horizontal, and means for simultaneously moving all of said louvers to vertical position, said means being arranged at the ends of said louvers to prevent obstructing the space between the latter.

6. The method of packing lengths of soft material which consists in feeding said lengths of material to a temporary supporting structure in timed relation to the relative movement of the latter with respect to the feeding means, whereby uniform spacing of said lengths is obtained, discharging said lengths from said supporting structure into a receptacle, whereby said uniform spacing is maintained, covering said lengths with a filler and depositing similarly spaced lengths of said soft material on said filler and out of contact with said first named lengths.

7. In a device of the class described, means for extruding soft rubber rods in various lengths greater than their finished lengths, means for cutting said rods to uniform length, and means for placing said cut lengths in spaced relation in a receptacle.

8. In a device of the class described, means for extruding soft rubber rods from a container in the direction of their lengths, a receptacle, means for delivering said rods thereto, and means for feeding said rods to said delivery means, said receptacle and said delivery means being relatively movable to effect a uniform spacing of said rods in said receptacle.

9. In a device of the class described, means for extruding soft rubber rods from a container, a pair of cutting members, and means for feeding said rods transversely between said cutting members whereby they are cut into uniform lengths.

10. In a device of the class described, means for extruding soft rubber rods from a container, a receptacle, means for delivering said rods thereto, and means for feeding said rods to said delivery means in a path at substantially right angles to their axis of extrusion, said receptacle and said delivery means being relatively movable to effect a uniform spacing of said rods in said receptacle.

In witness whereof, I hereunto subscribe my name this 18th day of August A. D., 1916.

JOHN CARL REICH.